Patented Oct. 27, 1931

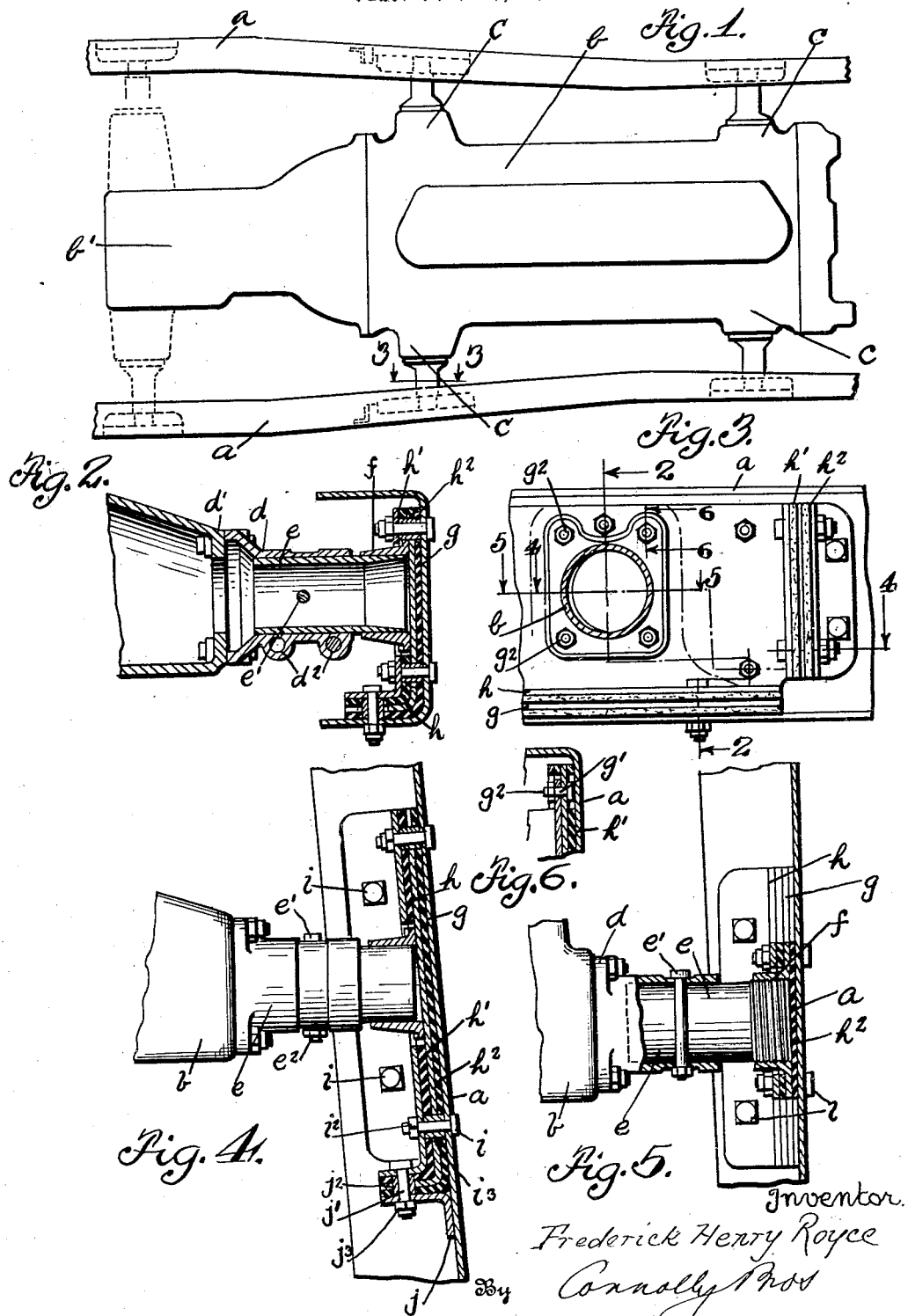

1,829,677

UNITED STATES PATENT OFFICE

FREDERICK HENRY ROYCE, OF ELMSTEAD, WEST WITTERING, NEAR CHICHESTER, ENGLAND, ASSIGNOR TO ROLLS ROYCE LIMITED, OF DERBY, ENGLAND

MOUNTING ENGINES IN MOTOR VEHICLES

Application filed February 13, 1930, Serial No. 428,118, and in Great Britain February 25, 1929.

This invention has reference to self propelled road vehicles and consists in a method of mounting the engine in the chassis and has for its object to secure the required amount of rigidity between the engine and the chassis frame and at the same time to secure in manner better than has hitherto been done a resilient or anti-vibratory connection between the engine and the frame.

It has been proposed to interpose between the metallic members of the engine and chassis constituting the connection pads of india rubber or the like, but in arrangements heretofore in use the rubber pads have permitted too much resiliency and in other respects such arrangements are not entirely satisfactory.

The object of this invention is to secure the desired degree of rigidity of the frame, utilizing the engine for such purpose, and at the same time secure the desired limited amount of resiliency between the engine and the frame in a manner better than has been heretofore attained.

The principle of this invention lies in making the metallic members constituting the respective connections with contacting faces of comparatively large area and providing corresponding large pads of rubber or other material so as to distribute the load over a large area of rubber.

According to this invention a plate or shoe of a comparatively large area rigidly secured to the engine is sandwiched between the side member of the chassis frame and another plate rigidly secured to the chassis frame, with a sheet of india rubber or the like of similar area interposed on each side of such plate or shoe between it on the one hand and the frame and said free plate on the other.

In the accompanying drawings a more detailed description of an example of this invention is illustrated.

Figure 1 is a plan view of a part of the chassis frame and the engine and gear box unit mounted thereon according to this invention.

Figure 2 is a sectional elevation on the line 2—2 in Figure 3 of the members constituting one of the rear supports.

Figure 3 is a sectional elevation on a plane at right angles to Figure 2 of the same support on the line 3—3 in Figure 1.

Figure 4 is a plan view partly in section on the line 4—4 in Figure 3 of the same support.

Figure 5 is a similar plan view on the line 5—5 in Figure 3 partly in section of one of the forward supports and Figure 6 is a scrap section on the line 6—6 in Figure 3.

$a$ are portions of the chassis frame, $b$ is the engine block and $b^1$ the gear box, $c$ are brackets projected from the crank case, $d$ are tubular members bolted to the crank case by nuts and bolts $d^1$ axially split along the underside thereof with bosses $d^2$ formed on such split part adapted to be clamped together. $e$ is a tubular member at one end clamped within the member $d$ and further secured thereto by a transverse bolt $e^1$ and nut $e^2$. $f$ is a member having a cylindrical boss and a flanged part, the former adapted to be secured to the tubular member $e$ and the latter adapted to be bolted (in the case of the rear support) and being integral with (in the case of the front support) the plate or shoe hereinafter described.

In the case of the rear supports (Figures 2 and 4) the member $e$ is brazed within the member $f$ but in the case of the front support (Figure 5) the two members are respectively externally and internally threaded and screwed together and brazed.

$g$ is a shoe in the form of a plate having a vertical piece adapted to lie parallel with the vertical side of the channel section chassis frame and the horizontal side adapted to lie parallel with the lower horizontal side of the chassis frame and $g^1$ are bolts and $g^2$ are nuts bolting the member $g$ (in the case of the rear suspension only) to the member $f$.

$h$ is a free plate of the like shape to that of the shoe $g$, but having a hole therethrough to allow the member $f$ to pass through it. $h^1$ and $h^2$ are sheets of india rubber sandwiched respectively between the plate $h$ and the shoe $g$ and between the shoe $g$ and the chassis frame $a$. These sheets of india rubber have recesses and holes therein and therethrough in regular pattern form.

$i$ are bolts and $i^2$ are nuts securing together the plate $h$, the shoe $g$, the chassis frame $a$ and the intervening sheets of india rubber. $i^3$ are distance pieces enveloping the bolts $i$ and holding apart the plate $h$ and the chassis frame so as to prevent undue pressure on the rubber sheets which are permanently under initial compression due to the action of the bolts, the recesses and holes therethrough helping to distribute the stress and to attain rigidity between the plate $h$ and the chassis frame. $j$ is an angle bracket having one side of the angle bolted to the frame and the other at right angles to it. $j^1$ are bolts encircled by distance pieces $j^2$ and having nuts upon them $j^3$ securing to such bracket the rear shoes $g$ and the associated plates $h$ and rubber sheets $h^1$ and $h^3$ (all being bent round for this purpose) the bracket thus constituting an endwise location of the engine unit with reference to the chassis frame.

On dotted lines in Figure 3 is shown the shape of the vertical portions of the shoes $g$ used for the forward supports.

In addition to the crank case supports shown in the drawings the gear box may also be so supported as shown in dotted lines in Figure 1.

With an engine mounting such as described the engine can be used to stiffen the chassis frame in all directions, but with a small predetermined degree of resilience between the engine and the chassis frame.

What I claim is:—

1. In a self propelled road vehicle having two longitudinal channelled side girders, means for mounting the engine in the vehicle comprising a vertical plate adapted to be secured to the vertical side of the channelled girder, means for rigidly securing the said plate, a vertical plate adapted to lie between the vertical side of the channelled girder and the said other vertical plate, a sheet of compressible resilient material interposed between the secondly mentioned vertical plate and the vertical side of the channelled girder, and a sheet of compressible resilient material interposed between the said two vertical plates, and means for rigidly securing the secondly mentioned plate to the engine consisting of a bracket projected from the side of the crank case having a vertical face with perforated bosses adapted to have a member bolted thereto, a tubular member split from end to end with perforated bosses on each side of the split adapted to envelope and clamp another tubular member and having formed at one end a flange with perforated bosses corresponding to the bosses on the bracket and secured thereto by bolts and nuts, and means for rigidly clamping and securing the secondly mentioned plate to the split tubular member.

2. In a self propelled vehicle having two longitudinal channelled side girders, means for mounting the engine in the vehicle as claimed in claim No. 1 the means for securing the secondly mentioned plate to the split tubular member consisting of a cylindrical projection extended from the secondly mentioned plate another tubular member inserted and clamped in the said split tubular member and rigidly secured to the said cylindrical projection.

3. In a self propelled vehicle having two longitudinal channelled side girders, means for mounting the engine in the vehicle as claimed in claim No. 1 the means for securing the secondly mentioned plate to the said split tubular member consisting of a tubular boss integral with and extended therefrom, the secondly mentioned plate internally threaded, another tubular member externally threaded and screwed into and brazed in the said other tubular member, and such other tubular member inserted and clamped, and pinned in the split tubular member.

4. In a self propelled vehicle having two longitudinal channelled side girders, means for mounting the engine in the vehicle as claimed in claim No. 1 the means of securing the secondly mentioned plate to the said split tubular member consisting of a plate bolted to the said secondly mentioned plate and having a tubular boss integral with and extended therefrom, another tubular member inserted into and brazed in the said tubular boss and inserted, clamped and pinned in the split tubular member.

5. In a self propelled road vehicle having two longitudinal channelled side girders, means for mounting the engine in the vehicle comprising a plate with a vertical part and a horizontal part adapted to be secured to the vertical and under horizontal sides of the channelled girder, means for so rigidly securing the said plate, another plate with a vertical part and a horizontal part adapted to lie between the channelled girder and the said other plate, means for rigidly securing the secondly mentioned plate to the engine, a sheet of compressible resilient material interposed between both parts of the secondly mentioned plate and the channelled girder, and a sheet of compressible resilient material interposed between both parts of the said two plates.

In testimony whereof I have hereunto affixed my signature.

FREDERICK HENRY ROYCE.